(12) United States Patent
Saito et al.

(10) Patent No.: US 7,735,767 B2
(45) Date of Patent: Jun. 15, 2010

(54) WEBBING TAKE-UP DEVICE

(75) Inventors: Takuhiro Saito, Niwa-gun (JP); Katsuki Asagiri, Niwa-gun (JP); Shuichi Harada, Niwa-gun (JP); Shinji Mori, Niwa-gun (JP); Fuminori Komiya, Niwa-gun (JP); Tomonori Kimura, Niwa-gun (JP); Hitoshi Takamatsu, Niwa-gun (JP); Tomonori Nagata, Niwa-gun (JP); Kazuhiko Aihara, Niwa-gun (JP); Masaki Yasuda, Niwa-gun (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 501 days.

(21) Appl. No.: 11/547,782

(22) PCT Filed: Mar. 7, 2005

(86) PCT No.: PCT/JP2005/003864

§ 371 (c)(1), (2), (4) Date: Jun. 19, 2007

(87) PCT Pub. No.: WO2005/097560

PCT Pub. Date: Oct. 20, 2005

(65) Prior Publication Data

US 2007/0278338 A1    Dec. 6, 2007

(30) Foreign Application Priority Data

| Apr. 8, 2004 | (JP) | 2004-114310 |
| Apr. 8, 2004 | (JP) | 2004-114311 |
| Apr. 9, 2004 | (JP) | 2004-115210 |

(51) Int. Cl.
 *B60R 22/46* (2006.01)

(52) U.S. Cl. .................. 242/390.8; 242/374; 310/71

(58) Field of Classification Search ................ 242/374, 242/390.8, 390.9; 280/806, 807; 297/475–478; 310/71

See application file for complete search history.

(56) References Cited

U.S. PATENT DOCUMENTS 4,381,464 A * 4/1983 Schnyder ..................... 310/45
4,529,143 A * 7/1985 Kanada et al. ........... 242/375.3

(Continued)

FOREIGN PATENT DOCUMENTS

JP          59-179148 U       11/1984

(Continued)

OTHER PUBLICATIONS

Taiwanese Official Letter (Office Action) dated Dec. 18, 2008 issued in corresponding Taiwanese Patent Application No. 094106289.
Japanese Office Action mailed Feb. 24, 2009 from corresponding Japanese Patent Application No. 2004-115210.
Japanese Office Action mailed Feb. 24, 2009 from corresponding Japanese Patent Application No. 2004-114310.

*Primary Examiner*—John Q Nguyen
*Assistant Examiner*—Scott Haugland
(74) *Attorney, Agent, or Firm*—Roberts Mlotkowski Safran & Cole, P.C.; Thomas W. Cole

(57) ABSTRACT

A webbing take-up device (10, 100) is disclosed, wherein a motor (44) is provided directly below a take-up shaft (20) between a pair of leg plates (16, 18) with a rotary shaft (50) of the motor (44) disposed perpendicularly to the take-up shaft (20), and a clutch (26) is provided at one side of one leg plate (16). Further, a gear (76) of a motor gear portion (46) is removably connected to a worm gear (34) in a clutch gear portion (28), and a mounting stay (84) is detachably attached to a case (30) with screws (86), so that the motor (44) and the motor gear portion (46) can be detached independently of the case (30) while still being assembled together. Still further, a pretensioner mechanism (156) and a sensor mechanism (182) are provided at one end side of a spool (118), and an urging mechanism (136) is disposed at the other end side thereof.

5 Claims, 6 Drawing Sheets

U.S. PATENT DOCUMENTS

| | | |
|---|---|---|
| 4,592,520 A | 6/1986 | Kawaguchi |
| 4,630,841 A | 12/1986 | Nishimura et al. |
| 4,659,108 A * | 4/1987 | Sack et al. ............... 280/807 |
| 4,669,680 A | 6/1987 | Nishimura et al. |
| 4,787,569 A * | 11/1988 | Kanada et al. ............ 242/371 |
| 5,005,777 A * | 4/1991 | Fernandez ............... 242/390.2 |
| 5,210,636 A * | 5/1993 | Baer ....................... 359/200.1 |
| 7,083,136 B2 | 8/2006 | Mori et al. |
| 7,108,284 B2 | 9/2006 | Mori et al. |

FOREIGN PATENT DOCUMENTS

| | | | |
|---|---|---|---|
| JP | 61-3054 | U | 1/1986 |
| JP | 3-85252 | U | 8/1991 |
| JP | 8-133015 | A | 5/1996 |
| JP | 11-278216 | A | 10/1999 |
| JP | 2001-130376 | A | 5/2001 |
| JP | 2001-347923 | A | 12/2001 |
| JP | 2002-2447 | A | 1/2002 |
| JP | 2004-42775 | A | 2/2004 |
| JP | 2004-42776 | A | 2/2004 |
| JP | 2004-42782 | A | 2/2004 |
| JP | 2004-42789 | A | 2/2004 |
| TW | 476718 | B | 2/2002 |

* cited by examiner

WEBBING TAKE-UP DEVICE

TECHNICAL FIELD

The present invention relates to a webbing take-up device. More particularly, the present invention relates to a webbing take-up device which causes a take-up shaft to rotate by a motor and take up a webbing.

BACKGROUND ART

A seat-belt apparatus for restraining a vehicle occupant has a webbing take-up device. Among the webbing take-up devices, there are so-called tension reducer mechanisms for mitigating or canceling a feeling of excessive pressure which a vehicle occupant suffers from when the vehicle occupant puts on the webbing, pretensioner mechanisms for eliminating slight looseness referred to as "slack" by causing the take-up shaft to take up a predetermined amount of a webbing belt at the time of a sudden deceleration of a vehicle, to increase the restraining force applied to a vehicle occupant's body by the webbing belt, and to hold a vehicle occupant's body with increased certainty. Further, there is known a so-called motor retractor which carries out the aforementioned functions by using a motor (see Patent Documents 1 and 2, as an example).

Such a motor retractor is quite useful because the motor retractor can implement the same functions as the aforementioned tension reducer or pretensioner can do, and also help the device take up and retract webbing at the time when the webbing is ordinarily fitted onto a vehicle occupant.

Particularly in recent years, in such a motor retractor as described above, a structure is considered in which a distance from a vehicle on which a vehicle occupant is riding to another vehicle or obstacles in front is detected by a forward-observation device such as a distance sensor, and when the distance between the vehicle and another vehicle or obstacles in front becomes less than a predetermined value, a motor is operated, and due to rotation force of the motor, a take-up shaft is rotated in a take-up direction.

Meanwhile, in the case of such a motor retractor as described above, in order to prevent transmission of rotation from the take-up shaft to the motor, a clutch is interposed between the output shaft of the motor and the take-up shaft. Accordingly, the clutch transmits only the rotation from the output shaft of the motor.

However, in such a conventional motor retractor, there has been a need to dispose a clutch opposite to an end portion of the take-up shaft. Therefore, the retractor has been structured such that a clutch device is disposed at the outer side of a pair of leg plates constituting a frame, a motor is disposed at the outer side of the leg plate at which the clutch is disposed (in other words, the same as the clutch), and the motor is disposed at the upper side or the lower side of the frame with respect to the pair of the leg plates. However, in such cases, since a comparative large and heavy part like the motor is positioned at the outer side of the frame and at the upper side or at the lower side, there have been drawbacks in that the entire body of the motor retractor becomes large, and the weight balance of the motor retractor itself becomes bad.

Also there is a desire that it be easy in such a motor retractor to change and set a gear ratio (deceleration ratio) of the driving force to be transmitted from the motor to the clutch, a rotational speed to be transmitted to the clutch when the motor is driven, and a rotational speed of the take-up shaft (set variations in the webbing take-up characteristics).

A certain webbing take-up device comprises a spool around which a webbing is taken up, a pretensioner mechanism for taking up the webbing around the spool in a vehicle emergency, and a detection mechanism for detecting a vehicle acceleration and a webbing pull-out acceleration from the spool (see Patent Document 3 as an example).

In the webbing take-up device, a pretensioner mechanism is disposed at one end portion of the spool, while a detection mechanism is disposed at the other end of the spool to exhibit excellent arrangement balance (spatial balance) of the mechanism between one end and the other end of the spool.

Patent document 1: Japanese Patent Application Laid-Open (JP-A) No. 2001-130376
Patent document 2: JP-A No. 2001-347923
Patent document 3: JP-A No. 8-133015

DISCLOSURE OF THE INVENTION

Problems to be Solved by the Invention

In view of the aforementioned facts, an object of the present invention is to obtain a webbing take-up device which not only allows a take-up shaft to rotate by a motor, but which is simply and compactly structured, to exhibit excellent weight balance.

A further object of the present invention is to obtain a webbing take-up device to obtain a webbing take-up device which allows a take-up shaft to rotate by a motor, which is structured simply and compactly to exhibit excellent weight balance, and in which it is easy to set variations of webbing take-up characteristics.

Another object of the present invention is to obtain a webbing take-up device which, even when an additional mechanism is added requiring a certain amount of arrangement space, can exhibit excellent arrangement balance at one side and the other of a take-up shaft.

Means for Solving the Problems

A first aspect of the invention is a webbing take-up device comprising a frame in which a pair of leg plates facing each other is integrally connected to each other by a back plate, a take-up shaft which is rotatably supported between the pair of the leg plates with an axial direction of the take-up shaft being parallel to a direction in which the pair of the leg plates face each other, to which a proximal end portion of a webbing belt for restraining a vehicle occupant is anchored, and which takes up the webbing belt due to one axial rotation thereof, a motor which is disposed between the pair of the leg plates with a rotation shaft thereof disposed perpendicularly with respect to the take-up shaft, a clutch which is disposed at a side of one leg plate of the pair of the leg plates, which is interposed mechanically between the motor and the take-up shaft, which transmits rotation of the motor to the take-up shaft to cause the take-up shaft to rotate, and which blocks transmission of rotation occurring at the side of the take-up shaft to prevent transmission of the rotation to the motor, and driving force transmission means that connect the motor and the clutch to transmit rotational force of the motor to the clutch.

A second aspect of the invention is a webbing take-up device, comprising a frame in which a pair of leg plates facing each other is integrally connected to each other by a back plate, a take-up shaft which is rotatably supported between the pair of the leg plates with an axial direction of the take-up shaft being parallel to a direction in which the pair of the leg plates face each other, to which a proximal end portion of a webbing belt for restraining a vehicle occupant is anchored, and which takes up the webbing belt due to one axial rotation thereof, a motor which is disposed between the pair of the leg plates with a rotation shaft thereof disposed perpendicularly with respect to the take-up shaft, and with an output side of the motor facing the opposite side of the back plate, a motor gear portion whose own shaft is disposed in parallel to the rotation shaft of the motor and which comprises a plurality of spur gears, and a clutch gear portion which consists of a worm gear which is disposed with its own shaft being disposed parallel to the rotation shaft of the motor and which is removably connected to a final spur gear of the motor gear portion; and a worm wheel which is disposed coaxially with the take-up shaft, which meshes with the worm gear to transmit rotation force of the worm gear to the clutch.

A third aspect of the present invention is a webbing take-up device comprising a take-up shaft which rotates in a take-up direction to take up a webbing, and which rotates in a pull-out direction to retract the webbing, a pretensioner mechanism which is disposed at one side of the take-up shaft to cause the take-up shaft to rotate in the take-up direction at a predetermined opportunity, and a detection mechanism which is disposed at one side of the take-up shaft to detect at least one of a moving acceleration and a rotation acceleration of the take-up shaft.

Effect of the Invention

The webbing take-up device according to the present invention can provide an excellent effect in that the take-up shaft can not only be rotated by a motor, but it is also structured simply and compactly to exhibit excellent weight balance.

The webbing take-up device according to the present invention can further provide an excellent effect in that setting of variations of the webbing take-up characteristics can be easily carried out.

BEST MODE FOR CARRYING OUT THE INVENTION

Figure 1:
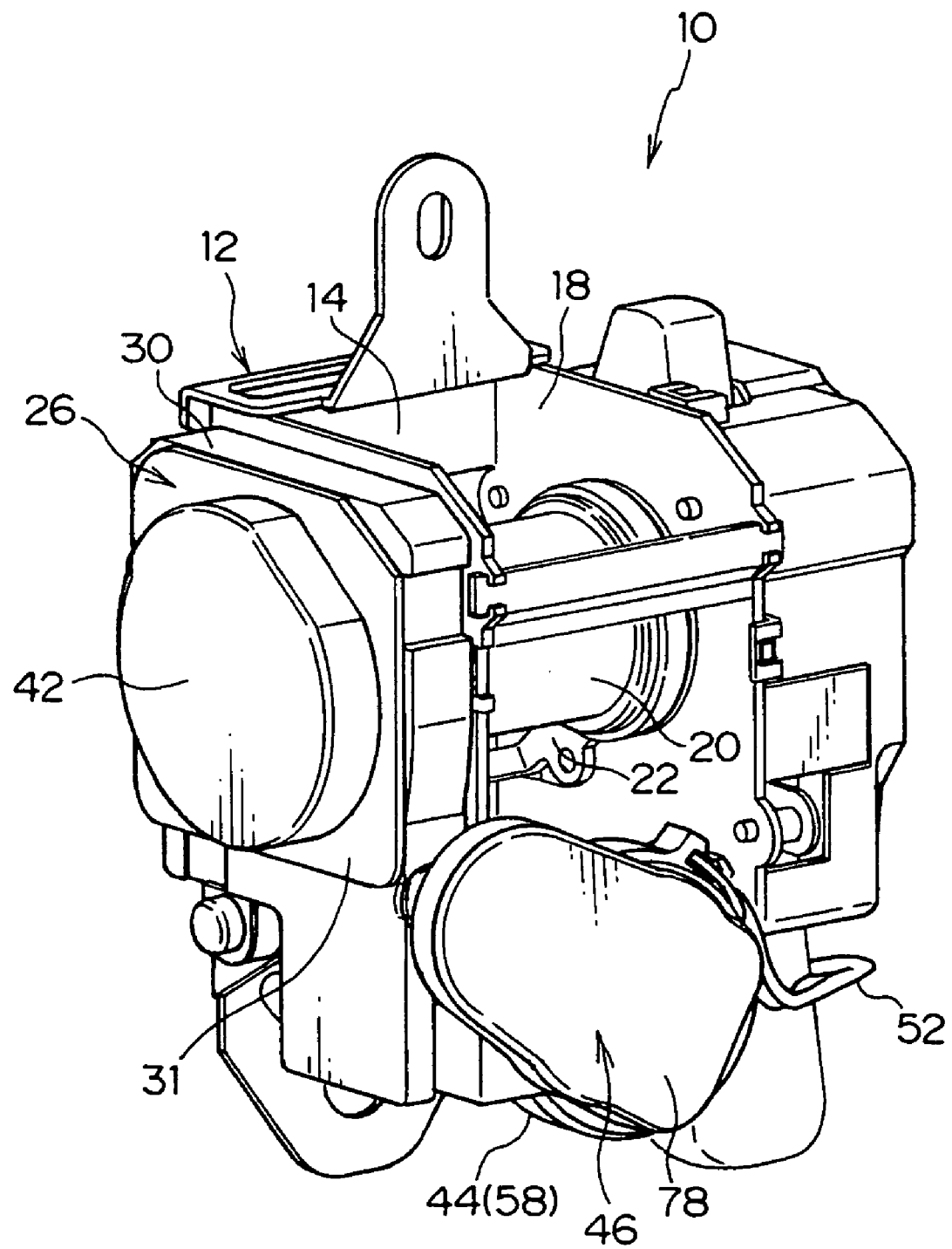
FIG. 1 is a perspective view illustrating an overall structure of a webbing take-up device according to an embodiment of the present invention.
Figure 2:
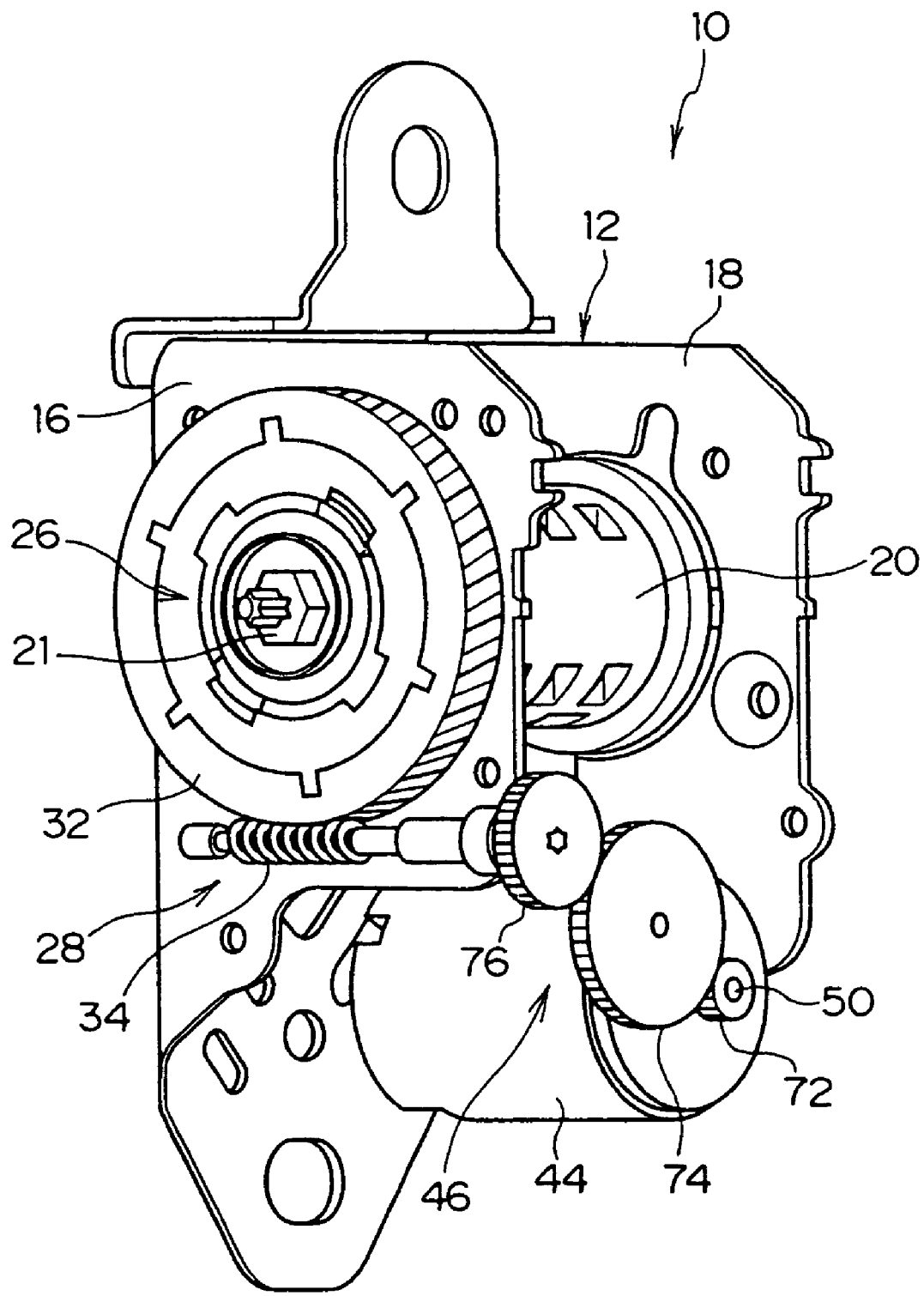
FIG. 2 is a perspective view illustrating a structure of a main portion of the webbing take-up device according to the embodiment of the present invention.
Figure 3:
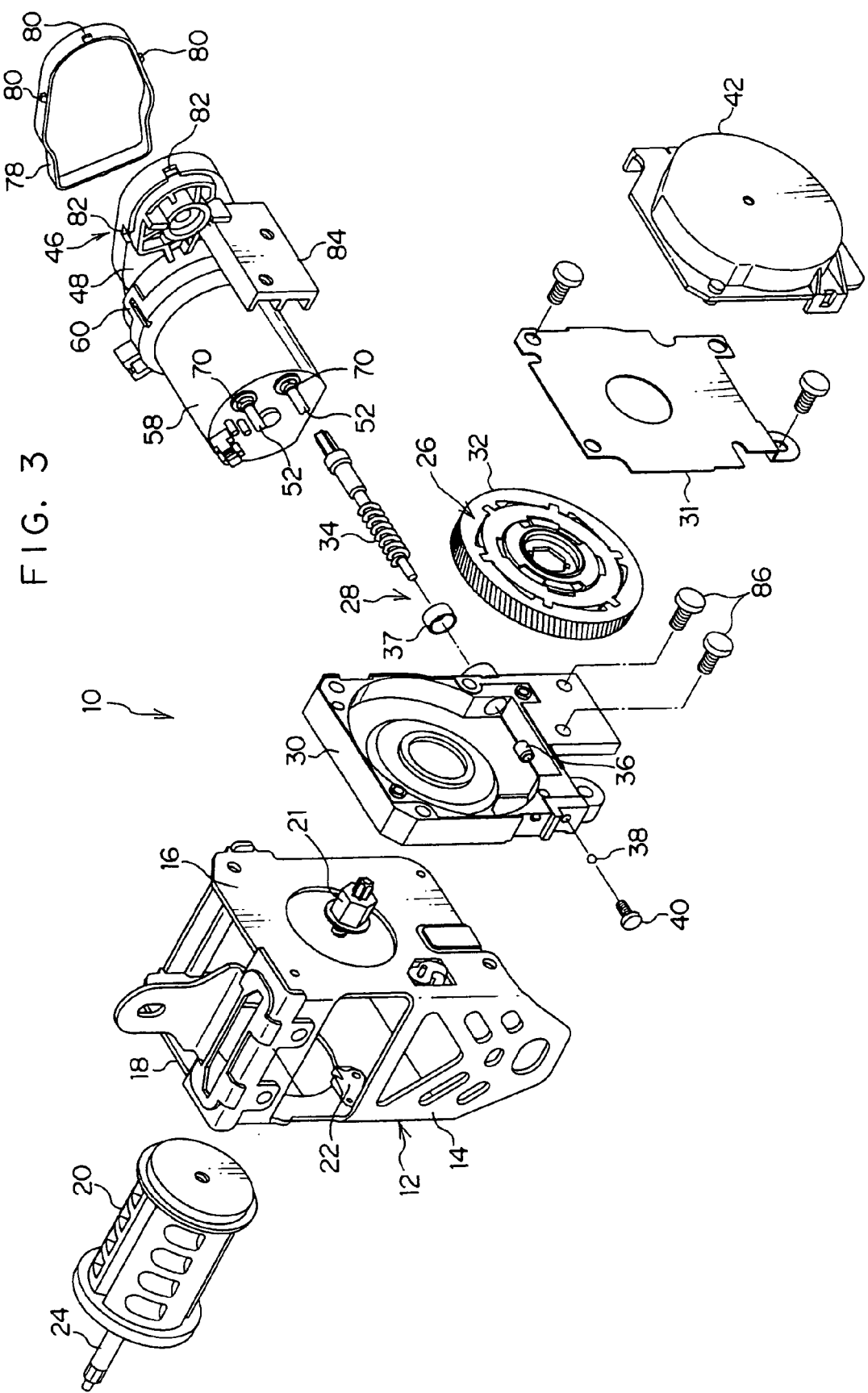
FIG. 3 is an exploded perspective view illustrating an overall structure of the webbing take-up device according to the embodiment of the present invention.

FIG. 1 is a perspective view of an overall structure of a webbing take-up device 10 according to an embodiment of the present invention, FIG. 2 is a perspective view of a structure of a main portion of the webbing take-up device 10, and FIG. 3 is an exploded perspective view of the overall structure of the webbing take-up device 10.

The webbing take-up device 10 includes a frame 12. The frame 12 is formed by a substantially plate-shaped back plate 14, and a pair of leg plates 16 and 18 that extend integrally from both edges in the widthwise direction of the back plate 14, and the frame 12 is attached to a vehicle body by the back plate 14 with unillustrated fastening means such as bolts.

A take-up shaft 20, which is manufactured by die casting or the like, is disposed rotatably between the pair of the leg plates 16 and 18 of the frame 12. The take-up shaft 20 is formed, as a whole, into a drum shape. A proximal end portion of an elongated strip-shaped webbing belt (not shown) is connected and fixed to the take-up shaft 20. When the take-up shaft 20 is caused to rotate in one axial direction (hereinafter, the direction is referred to as the "take-up direction"), the webbing belt is taken up in layers from the side of the proximal end of the webbing belt on the outer peripheral portion of the take-up shaft 20. On the other hand, if the webbing belt is pulled out from the side of the tip end thereof, accompanying this, the webbing belt is pulled out while the take-up shaft 20 is rotated (hereinafter, the direction in which the take-up shaft 20 at the time when the webbing belt is pulled out is referred to as a "pull-out direction").

One end side of the take-up shaft 20 is passed through the leg plate 18, to protrude to an outer side of the frame 12. At the leg plate 18 side is disposed an unillustrated lock mechanism. The lock mechanism includes an acceleration sensor that is linked to a lock plate 22 that spans between the leg plate 16 and the leg plate 18, and to a torsion bar 24 that is provided at an axial core portion of the take-up shaft 20. At the time of sudden deceleration of a vehicle, the lock mechanism operates to constrain one end of the torsion bar 24 through the lock plate 22 and absorb energy, while preventing the take-up shaft 20 from rotating in the pull-out direction.

On the other hand, a attachment screw 21 is fixed to the other end side of the take-up shaft 20. The attachment screw 21 is passed through the leg plate 16 to protrude outside of the frame 12, and a clutch 26 and a clutch gear portion 28 are disposed at the outside of the leg plate 16.

The clutch 26 and the clutch gear portion 28 are housed in a case 30. The clutch 26 is connected to the attachment screw 21. Further, the clutch 26 is connected to a gear wheel 32 that configures the clutch gear portion 28. The gear wheel 32 is a so-called worm wheel having worm wheel teeth formed at the outer peripheral edge thereof. The gear wheel 32 is disposed coaxially with the take-up shaft 20, and mechanically connected through the clutch 26 to the attachment screw 21 (i.e., the take up shaft 20). Therefore, due to rotation of the gear wheel 32, driving force is transmitted through the clutch 26 to the take-up shaft 20 to rotate the take-up shaft 20, while transmission of rotation created at the take-up shaft 20 side is blocked, and transmission of such rotation to the gear wheel 32 is prevented. Further, a tip end of the attachment screw 21 that is connected to the clutch 26 passes through the clutch 26 to extend to the side thereof.

A worm gear 34 configuring the clutch gear portion 28 is provided at the inside of the case 30 with its own shaft being disposed perpendicularly with respect to the take-up shaft 20 and with its end portions being supported by the case 30 through bushes 36 and 37, and the worm gear 34 meshes with the gear wheel 32. Further, one end side of the worm gear 34 is provided so as to protrude to the outer side of the case 30. Moreover, a shaft-receiving portion of the case 30 for supporting the tip end portion of the worm gear 34, houses therein a steel ball 38 that contacts the tip end portion of the worm gear 34, and an adjustment screw 40 is threaded into the shaft-receiving portion. The tip end portion of the adjustment screw 40 presses the steel ball 38 thereby causing the steel ball 38 to press-contact the tip end of the worm gear 34. By this, axial displacement of the worm gear 34 is prevented (is subjected to thrust adjustment). Due to rotation of the worm gear 34, the gear wheel 32 is rotated.

The case 30 which accommodates therein the clutch 26 and the clutch gear portion 28 structured as described above is covered with a clutch cover 31.

In this way, the clutch 26 and the clutch gear portion 28 are assembled together in the single case 30 and the whole is structured as a unit.

A spring unit 42 is disposed at a side of the clutch 26 and the clutch gear portion 28 (the case 30). The spring unit 42 accommodates therein a spiral spring (not shown). In the spiral spring, a spiral direction outer end portion of the spiral spring is anchored to the case main body, while a spiral direction inner end portion thereof is anchored to the tip end of the attachment screw 21 that passes through the clutch 26, thereby urging the take-up shaft 20 in the take-up direction.

A motor 44 and a motor gear portion 46 are disposed below the take-up shaft 20 between the leg plate 16 and the leg plate 18.

Figure 4:
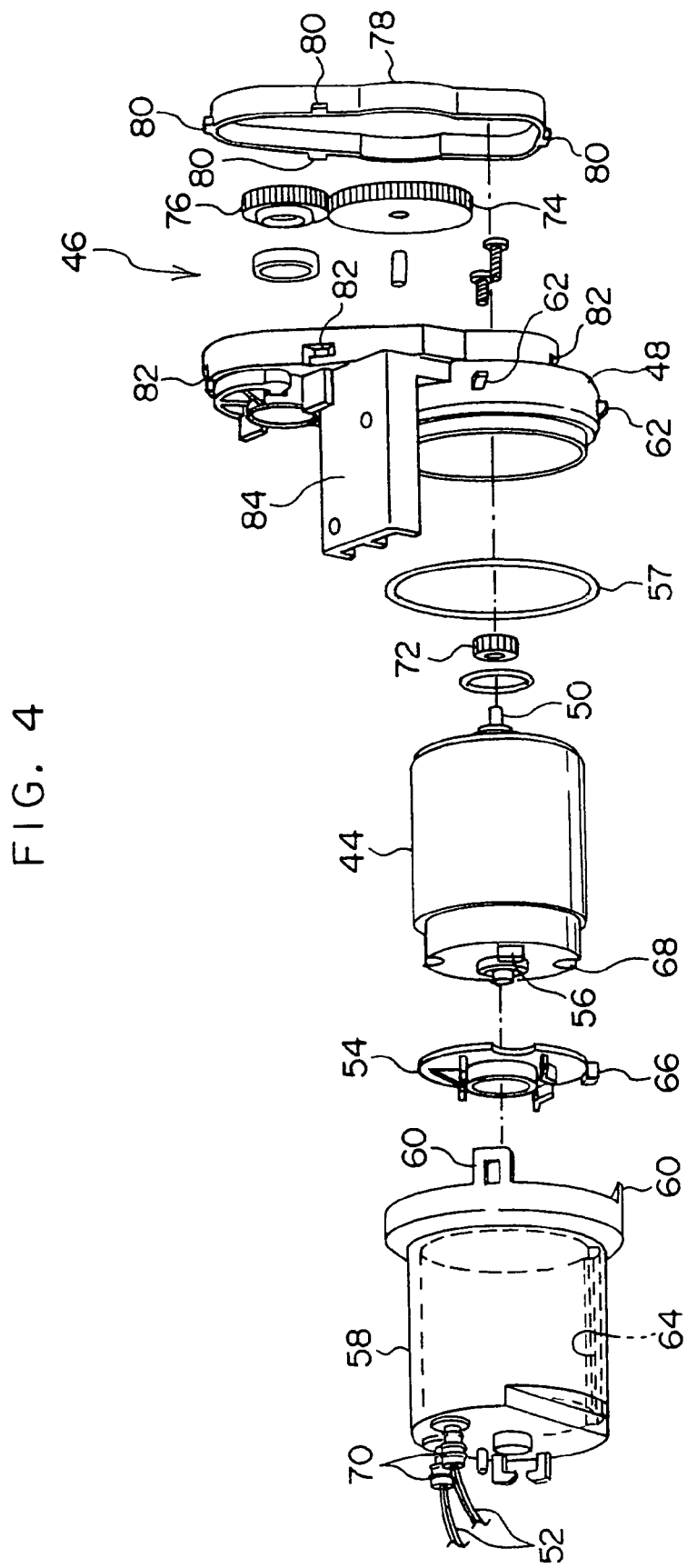
FIG. 4 is an exploded perspective view illustrating structures of a motor and a motor gear portion in the webbing take-up device according to the embodiment of the present invention.

Here, FIG. 4 is an exploded perspective view illustrating the structures of the motor 44 and the motor gear portion 46.

The motor 44 and the motor gear portion 46 provided with a housing 48. The motor 44 is mounted to one side of the housing 48, and the motor gear portion 46 is provided at the other side of the housing 48. The motor 44 is fixed to one side of the housing 48 with a tip end (output side) of a rotation shaft 50 of the motor 44 in the direction of the housing 48, with the tip end (at the output side) of the rotation shaft 50 protruding through to the other side of the housing 48 (the motor gear portion 46 side).

Figure 5:
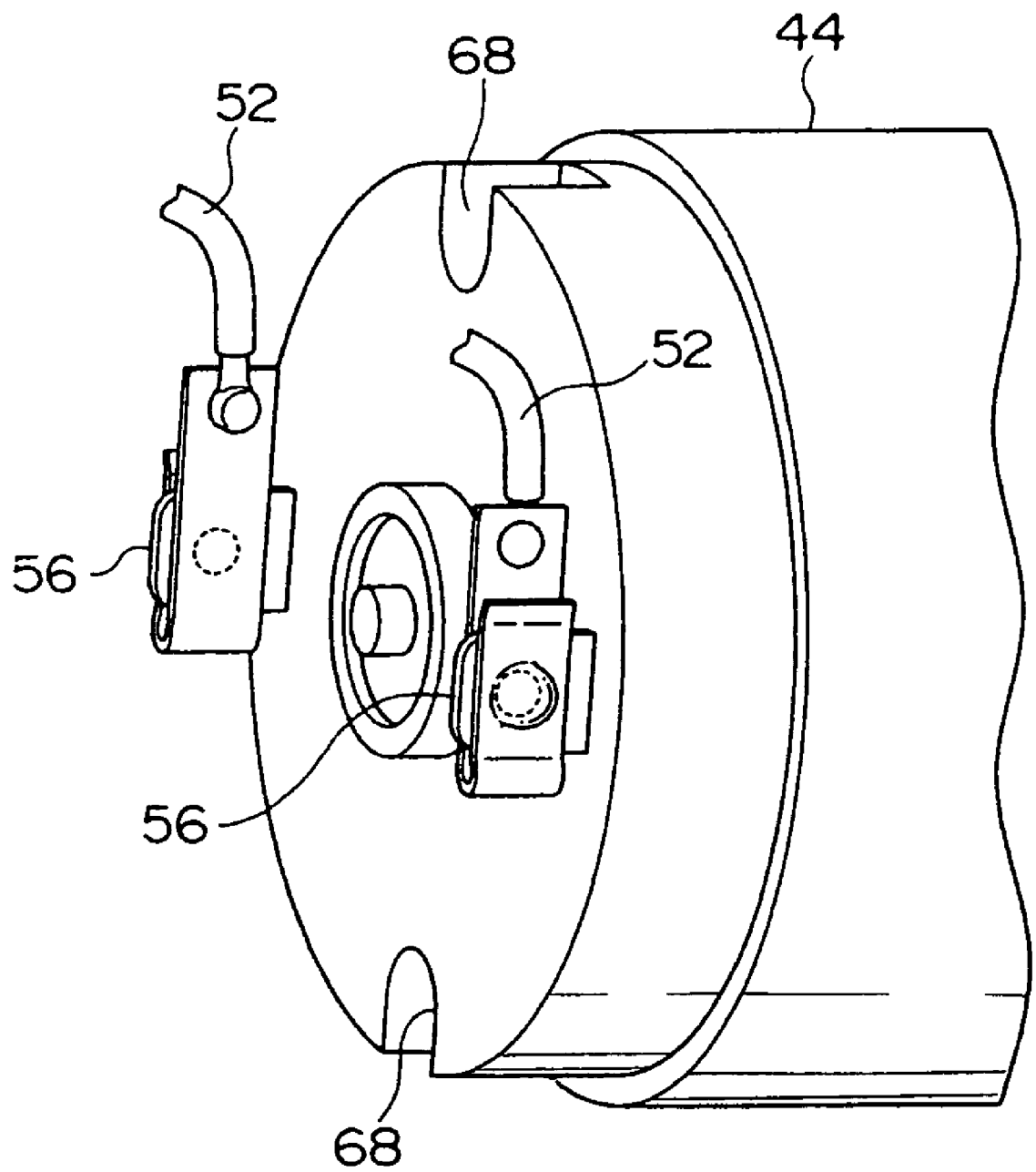
FIG. 5 is a perspective view illustrating a crimp-style terminal structure of a power supply terminal and electric harness of the motor in the webbing take-up device according to the embodiment of the present invention.

Further, a base plate 54 is attached to the back end of the motor 44. An electric harness 52 for driving the motor is placed at the base plate 54. As shown in FIG. 5, the electric harness 52 is connected with a crimp terminal structure to power supply terminals 56, which are provided at the main body portion of the motor 44.

Moreover, the motor 44 is covered with a motor cover 58 by placing an O ring 57 therebetween. The motor cover 58 includes pawl portions 60. By the pawl portion 60 being fit over and anchored to pawl receiving protrusions 62 that are formed at the housing 48, the motor cover 58 is fixed to the housing 48.

Further, a first concave portion 64 is formed at the motor cover 58. A convex portion 66, which can be fitted into the first concave portion 64, is formed at the base plate 54 so as to correspond to the first concave portion 64. A second concave portion 68 is provided on the motor 44, into which the convex portion 66 of the base plate 54 can be fitted.

In other words, the convex portion 66 is fitted into the second concave portion 68 so that the motor 44 is aligned with respect to the base plate 54, the convex portion 66 is fitted into the first concave portion 64 so that the base plate 54 is aligned with respect to the motor cover 58, and the pawl portions 60 are fitted over and anchored to the pawl receiving protrusions 62 so that the motor cover 58 is fitted over and anchored to the housing 48. Consequently, the assembly position around the axis of the motor 44 with respect to the housing 48 is univocally specified.

The electric harness 52 for driving the motor is taken out from the rear end portion of the motor cover 58 towards the back plate 14 of the frame 12, in the direction opposite to the output side of the motor 44. Moreover, the take-out portions that stick out of the electric harness 52 of the motor cover 58 are made water-resistant by using rubber caps 70.

A pinion 72 structuring plural spur gears of the motor gear portion 46 is attached to the tip end of the rotation shaft 50 of the motor 44, which tip end protrudes to the other side of the housing 48 (at the motor gear portion 46 side). A gear 74 and a gear 76, which mesh with each other, each of which has external teeth serving as a spur gear, and which are used to structure driving force transmission means, are accommodated into the motor gear portion 46. The gear 74 and the gear 76 are provided with their own shafts being disposed in parallel to the rotation shaft 50 of the motor 44. The gear 74 meshes with the pinion 72, and the gear 76 serving as a final spur gear is detachably connected to one end portion of the worm gear 34 protruding outwardly from the case 30 of the aforementioned clutch gear portion 28. For this reason, when the motor 44 is driven, driving force is transmitted through the pinion 72, the gear 74 and the gear 76 to cause the worm gear 34 to rotate.

The pinion 72, the gear 74 and the gear 76 are covered with a gear cover 78 attached to the housing 48. Pawl portions 80 are formed at the gear cover 78, the pawl portions 80 fit into and are anchored to the pawl receiving portions 82 in the housing 48, and the gear cover 78 is fixed to the housing 48.

In this way, both the motor 44 and the motor gear portion 46 are assembled integrally with the single housing 48 to structure a unit as a whole.

In the motor 44 and the motor gear portion 46 structured as described above, a mounting stay 84 which is provided integrally with the housing 48 is detachably attached with screws 86 to the case 30 (i.e., the frame 12) for accommodating therein the clutch 26 and the clutch gear portion 28. In the mounted/attached state of the housing 48 to the case 30 (frame 12), the motor 44 is set in a state in which the rotation shaft 50 of the motor 44 is disposed perpendicularly with respect to the take-up shaft 20, and the output side of the motor 44 is disposed at the opposite side of the frame 12 to that of the back plate 14, and the motor 44 is positioned directly below the take-up shaft 20 and between the pair of the leg plates 16 and 18.

In the motor 44 and the motor gear portion 46 structured as described above, the gear 76 as a final spur gear in the motor gear portion 46 is removably connected to the clutch 26 and the worm gear 34 of the clutch gear portion 28. Besides, since the mounting stay 84 is detachably attached to the case 30 with the screws 86, the motor 44 and the motor gear portion 46 can be detached independently from the case 30 (the frame 12), but still assembled together, by removing the screws 86 and by detaching the mounting stay 84 from the case 30 (frame 12).

The aforementioned motor 44 has a configuration in which operation is based on detection signals of a forward-observation device or the like.

The operation of the present embodiment will be explained next.

In the webbing take-up device 10 having the above-described structure, an attachment state of a webbing belt to a vehicle occupant body is set by the vehicle occupant seated on a vehicle seat putting the webbing belt across the occupant's body and by, for example, engaging a tongue plate equipped at the webbing belt with a buckle device.

In the webbing belt attachment state, even when take-up or pull-out of the webbing belt occurs due to various movements of the vehicle occupant's body, in other words, even when the take-up shaft 20 is rotated either in a take-up direction or in a pull-out direction, the clutch 26 prevents transmission of the rotation force of the take-up shaft 20 to the rotation shaft 50 of the motor 44.

On the other hand, for example, if an obstacle exists in front of a vehicle at the time of a vehicle traveling and a distance between the obstacle and the vehicle (distance from the vehicle to the obstacle) reaches within a predetermined range, the motor 44 begins to drive thereby causing the rotation shaft 50 to rotate suddenly.

Due to rotation of the rotation shaft 50 of the motor 44, rotation force is transmitted to the clutch 26 through the pinion 72, the gear 74, and the gear 76 in the motor gear portion 46 and the worm gear 34 of the clutch gear portion 28 and the gear wheel 32 and further transmitted through the clutch 26 to the take-up shaft 20 thereby causing the take-up shaft 20 to rotate in the webbing take-up direction. By this, slight looseness of a webbing belt referred to as "slack" is eliminated to improve the constraining force with respect to the vehicle occupant by using the webbing belt. Thereafter, even in a case in which the vehicle occupant brakes hard and the vehicle is set in a sudden deceleration state, the webbing belt can reliably protect the vehicle occupant.

Further, in this way, the motor 44 is stopped in a state where there is no slackness of the webbing belt, and a mechanical connection between the rotation shaft 50 and the take-up shaft 20 is released.

In the webbing take-up device 10 according to the present embodiment, the clutch 26 is disposed at the side of one leg plate 16 of the pair of the leg plates 16 and 18 structuring the frame 12 that supports the take-up shaft 20, and the motor 44 is provided immediately below the take-up shaft 20 between the pair of the leg plates 16 and 18 with the rotation shaft 50 of the motor 44 being disposed perpendicularly with respect to the take-up shaft 20. Therefore, as compared to a structure in which the motor 44 is disposed at the outer side of the frame 12, the entire body of the webbing take-up device 10 of the present invention can be made considerably compact. In other words, since a comparatively bulky part like the motor 44 is provided immediately below the take-up shaft 20 between the pair of the leg plates 16 and 18, the motor 44, the bulky part does not protrude outwardly from the frame 12 (leg plates 16 and 18) and space between the pair of the leg plates 16 and 18 is used effectively thus making it possible to make the device overall compact. Further, as compared to the structure in which the motor 44 is disposed at the outer side of the frame 12, the motor 44 as described above has the structure of being disposed directly below the take-up shaft 20 between the pair of the leg plates 16 and 18. Accordingly, the total weight balance of the webbing take-up device 10 can be placed towards the centre of the opposing leg plate 16 and the leg plate 18, thus making it possible to stabilize the webbing take-up device 10 from a viewpoint of weight.

In the webbing take-up device 10 according to the present embodiment, since the clutch 26 is disposed at the side of the leg plate 16 and the motor 44 is disposed directly below the take-up shaft 20 between the pair of the leg plates 16 and 18, the motor 44 and the clutch 26 can be disposed proximate to each other. Further, since the output side of the rotation shaft 50 of the motor 44 is disposed in the direction opposite to that of the back plate 14 of the frame 12, the motor gear portion 46 and the clutch gear portion 28 (driving force transmission means) connecting the rotation shaft 50 of the motor 44 and the clutch 26 can be disposed with more space. Accordingly, the motor gear portion 46 and the clutch gear potion 28 can be structured more simply, and also in this respect, the device can be made compact and manufacturing costs can be saved.

Since a comparatively heavy part like the motor 44 is disposed directly below the take-up shaft 20 between the pair of the leg plates 16 and 18, the motor 44 can be supported not by a single one of the respective leg plates 16 and 18, or the back plate 14 connecting the pair of the leg plates 16 and 18, but the motor 44 can be supported by two or all of the leg plates 16 and 18 and the back plate 14 as necessary. Accordingly, it becomes unnecessary to provide particularly improved strength for supporting the motor 44. As a result, it becomes possible to make the device compact and reduce the manufacturing cost.

In the webbing take-up device 10 according to the present embodiment, since the gear 76 as the final spur gear in the motor gear portion 46 and the worm gear 34 in the clutch gear portion 28 are removably connected to each other, the motor gear portion 46 can be detached or replaced independently of the clutch gear portion 28. Therefore, the motor gear portion 46 of the present invention can be easily replaced by or applied to another motor gear portion 46 by modifying the number of teeth thereof and that of the plural gears of the pinion 72, the gear 74 and the gear 76. This facilitates changing and setting a gear ratio (deceleration ratio) of the driving force to be transmitted from the motor 44 to the clutch 26, a rotational speed to be transmitted to the clutch when the motor 44 is driven, and a rotational speed of the take-up shaft 20 (setting variations of the webbing take-up characteristics).

Further, since the motor gear portion 46 can be detached or replaced independently of the clutch gear portion 28, as described above, even when the motor gear portion 46 is replaced or modified to change the gear ratio (deceleration ratio) or the like, there is no change to (influence on) either the meshing state between plural spur gears in the motor gear portion 46 or the meshing state of the worm gear 34 in the clutch gear portion 28 with the gear wheel 32. Accordingly, meshing accuracy of each tooth (gear) does not change, and so there is no decreasing (deteriorating) of the transmission rate of driving force.

Further, the motor 44 and the motor gear portion 46 are assembled integrally with the single housing 48 to form a unit, while the clutch 26 and the clutch gear portion 28 are assembled integrally with the single case 30 to form a unit. For this reason, as described above, even when the motor gear portion 46 is replaced or modified to change the gear ratio (deceleration ratio) or the like, there is no change to (influence on) either a meshing state between a plurality of spur gears in the motor gear portion 46 or a meshing state of the worm gear 34 in the clutch gear portion 28 with the gear wheel 32. Accordingly, meshing accuracy of each tooth (gear) does not change thereby not decreasing (deteriorating) transmission rate of driving force.

In the webbing take-up device 10 according to the present embodiment, by the convex portion 66 of the base plate 54 being fitted into the second concave portion 68 of the motor 44, the motor 44 is positioned with respect to the base plate 54, and by the convex portion 66 of the base plate 54 being fit into the first concave portion 64 the motor cover 58, the base plate 54 is positioned with respect to the motor cover 58. Further, by the pawl portions 60 of the motor cover 58 being fitted into and anchored to the pawl receiving protrusions 62 of the housing 48, the motor cover 58 is attached to the housing 48. Therefore, the assembly position around the axis of the motor 44 with respect to the housing 48 is specified. Accordingly, no complicated assembly and alignment of the plural aforementioned parts is required (the motor 44 is assembled with the housing 48 simply by fitting the second concave portion 68, the convex portion 66 and the first concave portion 64 with one another and by fitting and anchoring the pawl portions 60 with respect to the pawl receiving protrusions 62), and assembly performance is improved.

In a similar manner to this, in the webbing take-up device 10 according to the present embodiment, the motor gear portion 46 is covered with the gear cover 78, and the gear cover 78 is fixed to the housing 48 by the pawl portions 80 being fitted into and anchored with respect to the pawl receiving portions 82. Accordingly, the structure is simplified, and assembly performance is improved.

In the webbing take-up device 10 according to the present embodiment, since the electric harness 52 are connected to the power supply terminal 56 that is provided at the main portion of the motor 44 by a crimp terminal structure, harness connection operations are improved as compared to a connection structure such as soldering, for example, and the structure can be made smaller (space required for this region can be reduced).

In the webbing take-up deice 10 according to the present embodiment, since the electric harness 52 for driving a motor are taken out from the rear end portions of the motor cover 58 at the back plate 14 of the frame 12, the opposite side of the frame 12 to the output side of the motor 44, harness take-out portions are protected by the back plate 14 of the frame 12. Accordingly, it becomes possible to prevent the harness take-out portions from interfering and getting in the way of other parts and regions, and themselves from being damaged or abraded.

Figure 6:
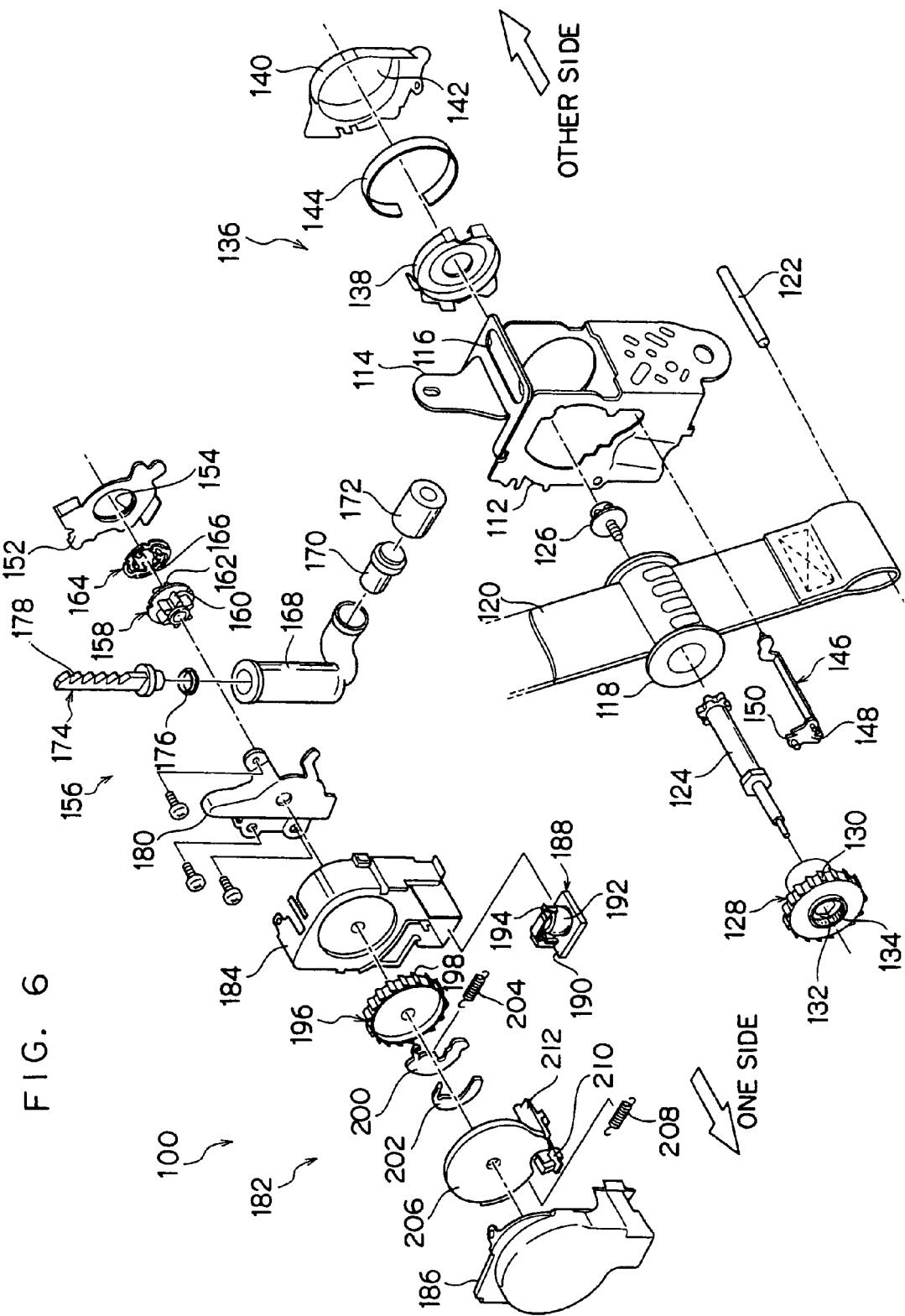
FIG. 6 is an exploded perspective view, seen diagonally from above and the side, showing a webbing take-up device according to another embodiment of the present invention.

FIG. 6 is an exploded perspective view, seen diagonally from above and the side, showing a webbing take-up device 100 according to another embodiment of the present invention.

A webbing take-up shaft 100 according to the present embodiment has a frame 112 which is formed into a substantially U shape as seen from the top, and the frame 112 is fixed to a vehicle compartment. A connecting piece 114 is spanned between the top of one side wall and the top of the other side wall of the frame 112, is fixed to the interior of the vehicle compartment, and has a communication hole 116 formed therethrough.

On the other hand, a spool 118, as a take-up shaft for forming a force limiter mechanism, is rotatably supported between the one side wall and the other wall of the frame 112. An elongated shaped webbing 120 is entrained around the spool 118. The webbing 120 is engaged with the spool 118 such that a cylinder shaped shaft 122 provided at the proximal end of the webbing 120 is engaged with the spool 118, and a portion in the vicinity of the proximal end is passed through the spool 118, and engaged with spool 118. Further, the webbing 120 is passed through the aforementioned through hole 116 in the vicinity of the taken-up portion around the spool 118 and fitted over a vehicle occupant. The spool 118 is rotated in the take-up direction so that the webbing 120 is taken up, and the spool 118 is rotated in the pull-out direction so that the webbing 120 is retracted.

The torsion shaft 124 (energy absorbing member) structuring the force limiter mechanism is disposed at a portion of the central axis of the spool 118. When a predetermined amount of distortion load or more is applied to the torsion shaft 124, the torsion bar is deformable. The other side end of the torsion shaft 124 is engaged with the other side end of the frame 118, the torsion shaft 124 is rotated integrally with the spool 118. Further, a screw member 126 is threaded at the other side end of the torsion shaft 124.

A lock gear 128 constituting the force limiter mechanism is disposed at one side of the spool 118. The lock gear 128 is locked in the vicinity of the one side end of the torsion shaft 124, the lock gear 128 is integrally rotated with both the torsion shaft 124 and the spool 118, other than in a case in which the torsion shaft 124 is twisted. Ratchet teeth 130 are formed at the outer periphery of the lock gear 128. Further, a substantially cylindrical knurled hole 132 is formed at the center of the lock gear 128. The knurled hole 132 opens to one side, and the entire outer periphery of the knurled hole 132 is knurled, so that a knurled surface 134 is formed.

An urging mechanism 136 is provided at the other side of the frame 112. The urging mechanism 136 includes a spring seat 138. The spring seat 138 is attached to the outer side of the other side wall of the frame 112. The spring seat 138 covers the other side surface of the spool 118 while allowing the screw member 126 to protrude to the other side. The other side of the spring seat 138 is covered with a spring cover 140. The spring cover 140 is attached to the outer side of the other side wall of the frame 112. A substantially cylindrical concave portion 142 is formed at the spring cover 140, and opens to one side.

A spiral spring 144 is provided at the inner side of the concave portion 142 of the spring cover 140. The outer side end of the spiral spring 144 is fixed to the inner peripheral surface of the concave portion 142. The inner side end of the spiral spring 144 is fixed to the screw member 126. The spiral spring 144 urges the torsion shaft 124, the spool 118 and the lock gear 128 in the take-up direction.

A lock member 146 is spanned between the one side wall and the other side wall of the frame 112. A lock plate 148 is provided at one side end of the lock member 146. One end of the lock plate 148 is rotatably supported by the lower portion of a gear case 152, as will be described below. The lock plate 148 is disposed diagonally beneath the lock gear 128. A lock tooth 150 is formed at the other end of the lock plate 148. The lock plate 148 is disposed at the side opposite to that of the lock gear 128 in a position such that the lock tooth 150 is not able to mesh with the ratchet teeth 130 of the lock gear 128.

A gear case 152 is provided at the outer side of one side wall of the frame 112. One side of the lock gear 128 is covered with the gear case 152. A circular through hole 154 is formed at the center of the gear case 152. The through hole 154 exposes the knurled hole 132 of the lock gear 128, and the torsion shaft 124 extends through the knurled hole 132.

A pretensioner mechanism 156 is disposed at the outer side of one side wall of the frame 112. The pretensioner mechanism 156 includes a pinion 158. The pinion 158 is disposed at one side of the gear case 152 and is rotatably supported on the torsion shaft 124. Pinion teeth 160 are formed at one side of the pinion 158. On the other hand, a cam 162 is formed at the other side of the pinion 158. Convexo-concaves are formed around the outer periphery of the cam 162. The cam 162 is inserted inside the knurled hole 132 via the through hole 154 of the gear case 152 and does not contact the knurled surface 134, so that the lock gear 128 is rotatable independently of the pinion 158.

The pretensioner mechanism 156 includes a clutch plate 164. The clutch plate 164 is disposed between the gear case 152 and the pinion 158. Plural mesh pawls 166 are formed at the center of the clutch plate 164. The mesh pawls 166 protrude toward the other side from the clutch plate 164. The mesh pawls 166 fit into the concave portions of the cam 162, whereby the clutch plate 164 is attached to the pinion 158. The mesh pawls 166 are inserted together with the cam 162 inside the knurled hole 132 via the through hole 154 of the gear case 152 and do not contact the knurled surface 134, so that the lock gear 128 is rotatable independent of the clutch plate 164.

The pretensioner mechanism 156 includes a substantially "L" shaped cylinder 168. The cylinder 168 is fixed to the outer side of one side wall of the frame 112 below the pinion 158. A gas generator 170 is disposed at a lower side end of the cylinder 168, and a bottomed cylindrical generator cap 172 is fixed to the gas generator 170. The gas generator 170 blocks off the lower end side of the cylinder 168 in a state where the gas generator 170 is covered with the generator cap 172.

The pretensioner mechanism 156 includes a piston 174. The piston 174 is inserted inside the cylinder 168 from an upper end of the cylinder 168. An O ring 176 is disposed at a lower end of the piston 174. The O ring 176 seals the space between the lower end of the piston 174 and the cylinder 168. A rack 178 is formed in the vicinity of the lower end of the piston 174.

The pretensioner mechanism 156 includes a generally triangular prism shaped, container-like cover plate 180, and the cover plate 180 is fixed to the outer side of one side wall of the frame 112. The cover plate 180 rotatably supports the torsion shaft 124 as a result of one side end of the torsion shaft 124 being passed through the cover plate 180 at the lower portion thereof. The other side surface and lower surface of the cover plate 180 are open. The cover plate 180 houses the pinion 158, the clutch plate 164 and the upper portion of the piston 174, and clamps the gear case 152 between the one side wall of the frame 112 and the cover plate 180.

A sensor mechanism 182 as a detecting mechanism is provided at one side of the pretensioner mechanism 156. The sensor mechanism 182 includes a box-shaped sensor holder 184 whose other side is closed. The sensor holder 184 is fixed to one side wall of the frame 112 in the state in which the torsion shaft 124 is passed through the upper portion of the sensor holder 184. One side of the sensor holder 184 is covered with a box-shaped sensor cover 186 whose other side is open. The sensor cover 186 is fixed to the sensor holder 184 and the one side wall of the frame 112.

An acceleration sensor 188 is held at the lower portion of the sensor holder 184. The acceleration sensor 188 is disposed in a space between the sensor holder 184 and the sensor cover 186. The acceleration sensor 188 includes a mounting portion 190. A concave portion which is formed as a substantially reversed cone-shape is formed in the upper surface of the mounting portion 190. A sphere 192 is mounted into the concave portion of the mounting portion 190. A movable pawl 194 is rotatably supported by the upper portion of the sphere 192. The movable pawl 194 is mounted above the sphere 192.

A V gear 196 is provided in a space between the sensor holder 184 and the sensor cover 186. One side end of the torsion shaft 124 is anchored to the V gear 196, and the V gear 196 rotates integrally with the torsion shaft 124. Further, the ratchet teeth 198 are formed at the outer periphery of the V gear 196.

A W pawl 200 is rotatably supported by the V gear 196. A W mass 202 is fixed to the W pawl 200. A sensor spring 204 is spanned between the V gear 196 and the W pawl 200. The sensor spring 204 urges the V gear 196 in the take-up direction with respect to the W pawl 200.

A substantially disc-shaped gear sensor 206 is provided at one side of the V gear in a space between the sensor holder 184 and the sensor cover 186. The gear sensor 206 is rotatably supported by one side end edge of the torsion shaft 124. A coil spring 208 is spanned between the gear sensor 206 and the inner surface of the sensor cover 186. The coil spring 208 urges the gear sensor 206 in the take-up direction.

An anchoring pawl 210 is rotatably supported by the lower portion of the gear sensor 206 at one side thereof. The axial direction of the rotation axis of the anchoring pawl 210 is parallel to that of the torsion shaft 124, and is able to mesh with ratchet teeth 198 of the V gear 196. Further, a pressing piece 212 is formed at the lower portion of the gear sensor 206 at the other side thereof.

Operation of the present embodiment will be explained next.

In the webbing take-up device 100 having the above-described structure, the webbing 120 is urged in the direction in which the webbing 120 is taken up around the spool 118 by the spiral spring 144 of the urging mechanism 136 urging, via the screw member 126, the torsion shaft 124, the spool 118 and the lock gear 128 in the webbing take-up direction.

The acceleration sensor 188 of the sensor mechanism 182 detects that vehicle acceleration (moving acceleration of the spool 118) is equal to or more than a predetermined acceleration. In other words, when the vehicle acceleration is equal to or more than the predetermined acceleration (at the time of a sudden deceleration of a vehicle), the sphere 192 of the acceleration sensor 188 is caused to move on the concave portion of the mounting portion 190 to the direction side opposite to the acceleration, so as to rise up to push the movable pawl 194. Accordingly, the gear sensor 206 is connected to the V gear 196 by the movable pawl 194 causing the anchoring pawl 210 of the gear sensor 206 to rotate and mesh with the ratchet teeth 198 of the V gear 196.

The W pawl 200, the W mass 202 and the sensor spring 204 in the sensor mechanism 182 detect when the pull-out acceleration of the webbing 120 (rotation acceleration in the direction of pull-out of the spool 118) is equal to or more than the specified acceleration. In other words, when the pull-out acceleration of the webbing 120 is equal to or more than the specified acceleration, with respect to the V gear 196 that is rotated in the pull-out direction via the spool 118 and the torsion shaft 124, the W pawl 200 and the W mass 202 are rotated with respect to the V gear 196 by rotation of the W pawl 200 and the W mass 202 in the pull-out direction being suppressed due to inertia. Therefore, the W pawl 200 causes the anchoring pawl 210 of the gear sensor 206 to rotate and mesh with the ratchet teeth 198 of the V gear 196. Accordingly, the gear sensor 206 is connected to the V gear 196.

As described above, when the sensor 206 is in the state of being connected to the V gear 196, due to a pull-out load applied from a vehicle occupant to the webbing 120, the V gear 196 and the gear sensor 206 are rotated in the pull-out direction to a certain degree via the spool 118 and the torsion shaft 124. Moreover, in this case, due to the urging force of the sensor spring 204 that has been increased by the inertia of the W pawl 200 and the W mass 202, rotation forces of the V gear 196 and the gear sensor 206 decrease.

In this way, due to slight rotation of the gear sensor 206 in the pull-out direction, the pressing piece 212 of the gear sensor 206 causes the lock plate 148 of the lock member 146 to rotate at the side of the lock gear 128. By this pull-out load applied from the vehicle occupant to the webbing 120, rotation force in the pull-out is applied to the spool 118, the torsion shaft 124 and the lock gear 128, and the lock tooth 150 of the lock plate 148 is meshed with the ratchet teeth 130 of the lock gear 128. Accordingly, rotation of the lock gear 128 in the pull-out direction and pull-out of the webbing 120 are prevented.

Further, in this way, in the state in which pull-out of the webbing 120 is prevented, if the torsion load that is applied from the vehicle occupant to the torsion shaft 124 via the webbing 120 and the spool 118 is equal to or more than a predetermined load, the force limiter mechanism is operated, the torsion shaft 124 is twisted, so that the spool 118 is rotated in the pull-out direction independently of the lock gear 128. Accordingly, the webbing 120 is pulled out, and the load (energy) applied from the webbing 120 to the vehicle occupant is absorbed.

Further, when the vehicle experiences an emergency situation (e.g., at the time of a sudden deceleration) the pretensioner mechanism 156 is activated and the gas generator 170 generates gas, whereby the piston 174 rises through the cylinder 168 together with the O ring 176, the rack 178 of the piston 174 meshes with the pinion teeth 160 of the pinion 158, and the pinion 158 is rotated in the take-up direction. For this reason, the pinion 158 is rotated relatively with respect to the clutch plate 164, and the mesh pawls 166 of the clutch plate 164 mesh with the convex portions of the cam 162 of the pinion 158, whereby the mesh pawls 166 of the clutch plate 164 are moved outward in the radial direction of the clutch plate 164 and mesh with the knurled surface 134 of the lock gear 128. Thus, the clutch plate 164 and the lock gear 128 are rotated in the take-up direction integrally with the pinion 158, whereby the torsion shaft 124 and the spool 118 are rotated in the take-up direction integrally with the lock gear 128, and the webbing 120 is taken up.

Here, the pretentioner mechanism 156 and the sensor mechanism 182 are disposed at one side of the frame 112 (one side of the spool 118). Therefore, even when an additional mechanism is provided requiring a certain arrangement space, in addition to the space required for the pretentioner mechanism 15 and the sensor mechanism 182, (for example, a motor retractor mechanism for taking up the webbing when a vehicle collision has been predicted or a selection mechanism for selecting an operation load (load by which the torsion shaft 124 is twisted)) the mechanisms may be given excellent arrangement balance (space balance) with one at one end and the other at the other end of the frame 112 by disposing the additional mechanism at the other side of the frame 112 (at the other end side of the spool 118).

Further, the urging mechanism 136 is disposed at the other side of the frame 112. However, the arrangement space for the urging mechanism 136 is small. Therefore, even when the urging mechanism 136 is disposed at the other side of the frame 112, the urging mechanism 136 may have excellent arrangement balance at one side and the other side of the frame 112.

DESCRIPTION OF THE REFERENCE NUMERALS

- 10: WEBBING TAKE-UP DEVICE
- 12: FRAME
- 13: BACK PLATE
- 16: LEG PLATE
- 18: LEG PLATE
- 20: TAKE-UP SHAFT
- 26: CLUTCH
- 28: CLUTCH GEAR PORTION
- 30: CASE
- 32: GEAR WHEEL
- 34: WORM GEAR
- 44: MOTOR
- 46: MOTOR GEAR PORTION
- 48: HOUSING
- 72: PINION
- 74: GEAR
- 76: GEAR
- 100: WEBBING TAKE-UP DEVICE
- 118: SPOOL (TAKE-UP DEVICE)
- 120: WEBBING
- 136: URGING MECHANISM
- 156: PRETENSIONER MECHANISM
- 182: SENSOR MECHANISM (DETECTION MECHANISM)

The invention claimed is:

1. A webbing take-up device, comprising:
a frame in which a pair of leg plates facing each other are integrally connected to each other by a back plate;
a take-up shaft which is rotatably supported between the pair of the leg plates with an axial direction of the take-up shaft being parallel to a direction in which the pair of the leg plates face each other, to which a proximal end portion of a webbing belt for restraining a vehicle occupant is anchored, and which takes up the webbing belt due to axial rotation in one direction thereof;
a motor which is disposed between the pair of the leg plates with a rotation shaft thereof disposed perpendicularly with respect to the take-up shaft, and with an output side of the motor facing the direction opposite to that of the back plate;
a motor gear portion which comprises a plurality of spur gears whose axes of rotation are disposed in parallel to the rotation shaft of the motor;
a clutch which is disposed at a side of one leg plate of the pair of the leg plates, which is interposed mechanically between the motor and the take-up shaft, which transmits rotation of the motor to the take-up shaft to cause the take-up shaft to rotate, and which blocks transmission of rotation occurring at the side of the take-up shaft to prevent transmission of the rotation to the motor; and
a clutch gear portion which comprises a worm gear, the worm gear being disposed with its own shaft parallel to the rotation shaft of the motor and being is removably connected to a final spur gear of the motor gear portion, and a worm wheel which is disposed coaxially with the take-up shaft, which meshes with the worm gear to transmit rotation force of the worm gear to the clutch,
the webbing take-up device further comprising: a housing to which the motor is attached; a motor cover for covering the motor, a base plate which is disposed between the motor and the motor cover, a first concave portion which is formed at the motor cover, a convex portion which is formed at the base plate so as to correspond to the first concave portion, and which is fittable into the first concave portion, a second concave portion which is formed at the motor so as to correspond to the convex portion and into which the convex portion is fittable, pawl portions which are provided at the motor cover, and pawl receiving portions which are provided at the housing so as to correspond to the pawl portions and to which the pawl portions can be anchored,
wherein the motor is positioned with respect to the base plate by fitting the convex portion into the second concave portion, the base plate is positioned with respect to the motor cover by fitting the convex portion into the first concave portion, the motor cover is positioned with respect to the housing by anchoring the pawl portions to the pawl receiving portions, so that an assembly position around the axis of the motor with respect to the housing is specified.

2. The webbing take-up device according to claim 1, wherein an electric harness for driving said motor is taken out from rear end portions of the motor cover from a side opposite to that of the output side of the motor.

3. The webbing take-up device according to claim 2, wherein take-out portions of the electric harness are made resistant to water by using rubber caps.

4. The webbing take-up device according to claim 2, wherein the electric harness for driving the motor is connected to power supply terminals that are disposed at a main body portion of the motor by a crimp terminal structure.

5. The webbing take-up device according to claim 1, wherein the motor gear portion is covered with a gear cover, and the gear cover is fixed to the housing by anchoring pawls.

* * * * *